3,000,042
LEG MOUNT FOR FURNITURE GLIDES
Frederick N. Reynolds, Augusta, Ky., assignor to The
F. A. Neider Company, Augusta, Ky., a corporation of
Kentucky
Filed Dec. 10, 1959, Ser. No. 858,812
6 Claims. (Cl. 16—42)

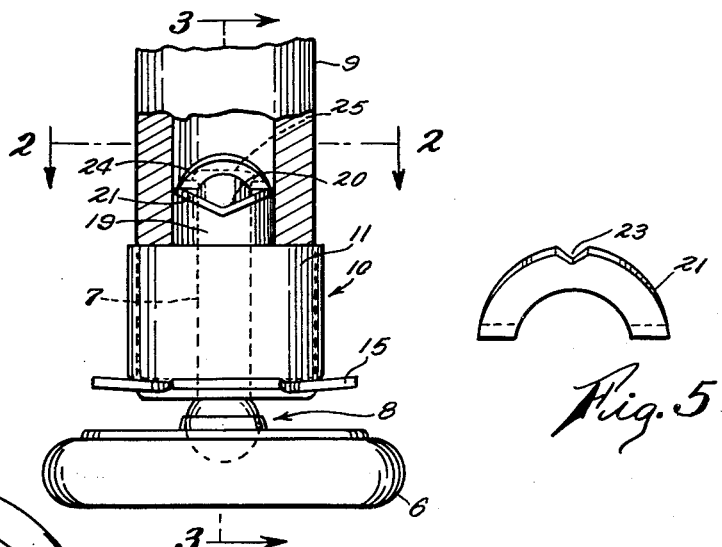
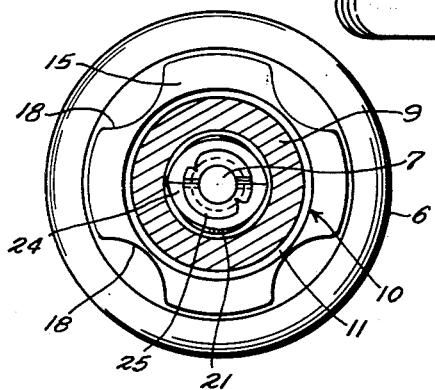
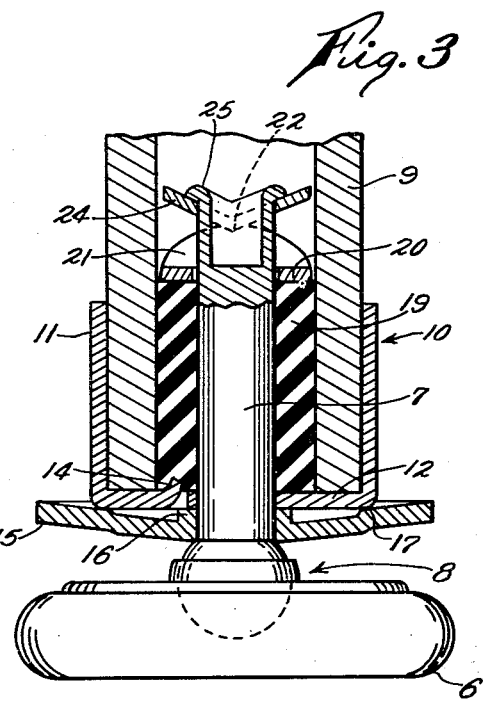
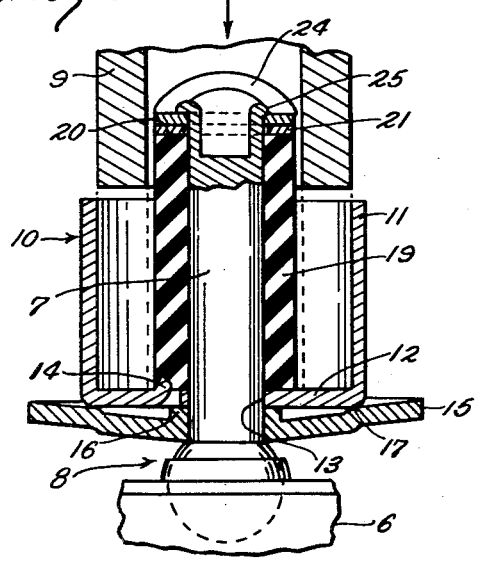
Sept. 19, 1961 — F. N. REYNOLDS — 3,000,042
LEG MOUNT FOR FURNITURE GLIDES
Filed Dec. 10, 1959
INVENTOR.
Frederick N. Reynolds 3,000,042
Patented Sept. 19, 1961

The present invention relates to glides, casters, or the like, for tubular furniture and specifically to an improved leg mount therefor which permits manual insertion of the mount into the end of the tubular furniture member and provides an expansile means, manually operable after placement, to secure the amount on the member against inadvertent removal therefrom.

An object of the invention is to provide a quick acting, manually operable and inexpensive expansile device for positively securing a leg mount to the end of a tubular member; said device being secured to or removed from said member by a simple hand operation and upon securement offering positive locking means resisting removal of the amount during ordinary use thereof.

Another object of the invention is to provide a positive holding device for glides that can be installed without the use of tools of any kind, and especially without impact tools; said holding device having a simplified, yet positive lock means for securing the device in mounted position after placement on the end of a tubular member.

With the above and other objects in view which will become apparent as the nature of the invention is better understood the same consists in the novel construction, combination and arrangement of parts hereinafter more fully described and illustrated in the accompanying drawings, wherein:

FIG. 1 is a fragmental, side elevational view of a glide provided with my mounting means, and showing a portion of the end of a tubular member broken away and cross-hatched.

FIG. 2 is a section taken on line 2—2 of FIG. 1.

FIG. 3 is a somewhat enlarged, fragmental section taken on line 3—3 of FIG. 1.

FIG. 4 is a view like FIG. 3 showing the leg mount in relaxed, inoperative condition before insertion into the end of a tubular member.

FIG. 5 is a detail view showing in side elevation one of the pair of cams for my mount.

Now referring to the drawings which illustrate the preferred embodiment of my invention the reference number 6 indicates a floor engaging shoe or glide member which has a pintle 7 swiveled thereto by the usual ball and socket joint, indicated generally by the numeral 8. Other types of glides and other glide-to-pintle connections may be employed, it being understood that my leg mount could secure casters, slides and other members to the end of a tubular member 9 which is illustrated in the drawing as being the lower end portion of the supporting leg for a piece of furniture.

My leg mount includes a ferrule 10 which has a circular sidewall 11 that encircles the end of the leg 9 and has an internal diameter that insures a snug fit with the external surface of the leg end portion. A planar bottom wall 12 of the ferrule is provided with a central hole 13 for freely receiving the pintle 7, said ferrule also having several spurs 14 projecting upwardly from the interior side of the bottom wall that are preferably formed by piercing the bottom wall with a suitable punching tool from the exterior side thereof.

A manually operable spacer 15 is fixed on the pintle 7 between its lower spherical end and the ferrule 10, said spacer having a perforated central portion that has the peripheral edge portion around the perforation drawn to form an upwardly projecting circular flange 16 through which the pintle is forcefully driven during assembly to secure a non-rotatable connection between the spacer and the pintle. As best shown in FIGS. 3 and 4 the spacer is supported upon the spherical end of the pintle whilst the spacer is dished whereby the ferrule rests on an intermediate circular shoulder 17 formed on the upper surface of the spacer and upon the upturned edge of the flange 16 which contacts the bottom of the ferrule around the pintle receiving hole 13 therein. With reference to FIG. 2 it will be noted that a peripheral edge portion of the spacer projects outwardly beyond the body of the ferrule 10 and the portion is provided with cut-outs 18 at spaced apart angular intervals to afford a hand gripping means to aid in operating the locking means for the mount, as will appear more fully hereinafter.

A resilient sleeve 19 is free of the pintle 7 and has an outside diameter considerably smaller than the inside diameter of the ferrule and slightly less than the inside diameter of the end of the tubular member 9, whereby, as illustrated in FIG. 4, the said tubular end may be positioned in axial alignment with the mount and manually moved axially into operative position in which said position the ferrule will snugly receive the tubular end whilst the rubber sleeve will be normally free within the tubular end. The resilient sleeve 19 bears at its lower end against the bottom 12 of the ferrule and by reason of the fact that the spurs 14 pierce the bottom end of the sleeve and project into the body thereof there is established a non-rotatable connection between the ferrule and the sleeve.

The entire upper end of the sleeve is provided with a laterally extending, V-shaped notch 20 in which is seated a first V-shaped cam washer 21 that is free on the upper end of the pintle 7. As clearly shown in FIG. 5 the apices of the opposed upturned circular edges of the cam washer 21 are provided with notches 22 and 23 that are positioned in spaced lateral alignment with each other. A co-operating second V-shaped cam washer 24 is mounted on the upper end of the pintle 7, said pintle end being swedged outwardly at 25 over the said V-shaped cam washer 24 to secure the parts of the mount together and form a non-rotatable connection between said washer 24 and the pintle 7.

In FIG. 4 the parts of the mount are shown in the relaxed, inoperative position they assume when the mount is to be inserted into the end of a tubular member. It will be seen that in this condition the V-shaped cam washers 21 and 24 are in face-to-face relationship and that the sleeve is in a relaxed, and relatively elongated, laterally contracted condition whereby the mount may be easily inserted into operative position in the member 9 with the end fully inserted into the ferrule and the resilient sleeve snugly located within the member. To lock the mount on the tubular end the parts are manually moved to the positions indicated in FIGS. 1-3 of the drawing. This locking action is accomplished by manually holding the ferrule 10 stationary on the tubular member whilst manually turning the spacer 15 through approximately 90°. By holding the ferrule 10 stationary the resilient sleeve 19 and the cam washer 21 seated in the notched upper end 20 of the resilient sleeve will be held substantially stationary whilst rotation of the spacer 15 through 90° will rotate the pintle 7 and the cam washer 24 through a similar angular motion thus causing the cam washer 24 to ride up on the opposed circular edges of the cam washer 21 until the opposed outer V-shaped edge portions of the cam washer 24 fall into the opposed notches 22 and 23 in the apices of the cam washer 21. This camming action will axially compress the resilient sleeve 19 and tend to expand the sleeve within the restricted interior of the end of the tubular member 9 thus crowding the sleeve into the restricted area and positively locking the mount on the tubular end. An operator will know when the cam washers 21 and 24 are in locked position because of the "feel" on the spacer when the cam washer 24 drops into the notches 22 and 23 in the cam washer 21. If for any reason the glide mount must be removed from the tubular end the spacer 15 need only be rotated another 90° whereby the sleeve will be elongated and consequently relaxed to release the locking means and permit easy removal of the glide from the tubular member.

What is claimed is:

1. In a mount for insertion into the end of a tubular member the combination with a shoe having a mounting pintle secured to and projecting upwardly therefrom, of a tubular member receiving ferrule rotatably supported concentrically on the pintle, a resilient sleeve loosely mounted on the pintle and located in the ferrule, means for securing the lower end of the sleeve to the ferrule, a cam washer free on the upper end of the pintle, means for securing a non-rotatable connection between the upper end of the sleeve and said washer, and a co-operative cam means fast on the upper end of the pintle and having a rotatable camming engagement with the cam washer whereby upon relative rotation between the ferrule and washer cam means the cam washer will be moved axially away from the cam means to axially compress the sleeve and force the sleeve body laterally out against the inside of the tubular member.

2. In a mount for insertion into the end of a tubular member the combination with a shoe having a mounting pintle projecting upwardly therefrom, of a spacer fixed on the pintle, a tubular member receiving ferrule rotatably supported concentrically on the pintle above the spacer, said spacer having a peripheral edge portion projecting outwardly beyond the body of the ferrule, a resilient sleeve free on the pintle and located in the ferrule, a non-rotatable connection between the lower end of the sleeve and the ferrule, a first cam element free on the pintle and seated against rotation on the upper end portion of the sleeve, and a second cam element fixed on the upper end of the pintle and having relative rotation on the first cam element whereby said first cam element will have axial movement on the pintle to axially compress the resilient sleeve and expand its body laterally into mounting engagement with the tubular member.

3. The invention as defined in claim 2 further characterized in that the first and second cam elements are similarly shaped, laterally extending V-shaped washers.

4. The invention as defined in claim 3 further characterized in that the apices of the first V-shaped cam washer are provided with opposed notches for receiving and locking the second V-shaped cam washer in operative mounting condition.

5. In a furniture support for attachment to the tubular end of furniture, a floor engaging shoe, a pintle connected at its lower end to the shoe and projecting upwardly therefrom, an expansile element on the pintle, a furniture leg supporting member mounted on the pintle for relative rotatory movement thereon and having a non-rotative connection with the lower end of the expansile element, manually operable means fixed on the pintle and projecting outwardly beyond the body of the leg supporting member for rotating the pintle, a cam element seated against rotation on the upper end of the expansile element and free on the upper end portion of the pintle, and a co-operable cam element fixed on the upper end of the pintle whereby upon relative rotation of the cam elements the expansile element is axially compressed and correspondingly expanded laterally to fixedly mount the support on the tubular end of furniture.

6. In a furniture support for attachment to the tubular end of furniture, a floor engaging shoe, a pintle connected at its lower end to the shoe and projecting upwardly therefrom, a dished spacer having a centrally located, upturned annular flange tightly gripping the lower end portion of the pintle to provide a non-rotative connection between the pintle and spacer, an annular, concentric shoulder formed on an intermediate portion of the upper surface of the spacer, a tubular furniture end receiving ferrule free on the pintle and having a bottom wall resting upon the shoulder and flange on the spacer, said spacer having a peripheral edge portion projecting outwardly beyond the body of the ferrule and having hand grip notches formed in said edge portion, an expansile element free on the pintle and located in the ferrule, a non-rotative connection between the lower end of the expansile element and the bottom of the ferrule, a cam element seated against rotation on the upper end of the expansile element and free on the upper end portion of the pintle, and a co-operable cam element fixed on the upper end of the pintle whereby upon relative rotation of the cam elements the expansile element is axially compressed and correspondingly expanded laterally to fixedly mount the support on the tubular end of furniture.

References Cited in the file of this patent

UNITED STATES PATENTS

| | | |
|---|---|---|
| 1,919,666 | Patterson | July 25, 1933 |
| 2,479,862 | Payne | Aug. 23, 1949 |
| 2,748,419 | Kramcsak | June 5, 1956 |
| 2,860,368 | Thornsbury | Nov. 18, 1958 |

UNITED STATES PATENT OFFICE

CERTIFICATE OF CORRECTION

Patent No. 3,000,042                  September 19, 1961

Frederick N. Reynolds

It is hereby certified that error appears in the above numbered patent requiring correction and that the said Letters Patent should read as corrected below.

Column 3, line 25, strike out "washer", first occurrence.

Signed and sealed this 6th day of February 1962.

(SEAL)
Attest:

ERNEST W. SWIDER
Attesting Officer

DAVID L. LADD
Commissioner of Patents